United States Patent [19]

Kawamura et al.

[11] Patent Number: 5,576,759

[45] Date of Patent: Nov. 19, 1996

[54] IMAGE PROCESSING SYSTEM FOR CLASSIFYING REDUCED IMAGE DATA

[75] Inventors: Koichiro Kawamura, Shonan-machi; Masahiro Suzuki, Kawasaki, both of Japan

[73] Assignee: Nikon Corporation, Tokyo, Japan

[21] Appl. No.: 441,012

[22] Filed: May 15, 1995

Related U.S. Application Data

[63] Continuation of Ser. No. 164,225, Dec. 7, 1993, abandoned.

[30] Foreign Application Priority Data

Dec. 7, 1992 [JP] Japan ................................. 4-326858

[51] Int. Cl.$^6$ ........................ H04N 5/225; H04N 5/76
[52] U.S. Cl. ..................... 348/231; 348/222; 360/72.2
[58] Field of Search ................................. 348/220, 231, 348/232, 335, 906; 358/313; 360/71, 35.1, 72.1, 72.2; 382/216, 305; H04N 5/225, 5/78

[56] References Cited

U.S. PATENT DOCUMENTS

| | | | |
|---|---|---|---|
| 3,490,844 | 12/1970 | Sapp, Jr. . | |
| 4,420,773 | 12/1983 | Toyoda et al. | 348/233 |
| 4,456,931 | 6/2684 | Toyoda et al. | 358/906 |
| 4,471,382 | 9/1984 | Toyoda et al. | 358/183 |
| 4,607,949 | 8/1986 | Hakamada et al. | 355/40 |
| 4,802,019 | 1/1989 | Harada et al. | 360/72.2 |
| 4,845,525 | 7/1989 | Ito | 355/218 |
| 4,862,223 | 8/1989 | Yamashita | 355/54 |
| 5,016,039 | 5/1991 | Sosa et al. | 354/430 |
| 5,016,107 | 5/1991 | Sasson et al. | 348/231 |
| 5,027,230 | 6/1991 | Nakayama | 360/35.1 |
| 5,159,365 | 10/1992 | Takahashi et al. | 354/21 |
| 5,164,865 | 11/1992 | Shaw | 360/72.2 |
| 5,179,409 | 12/1993 | Kazami et al. | 355/75 |
| 5,194,967 | 3/1993 | Nonomura | 358/468 |
| 5,235,471 | 8/1993 | Fell et al. | 360/73.06 |

FOREIGN PATENT DOCUMENTS

| | | | |
|---|---|---|---|
| 61-117986 | 6/1986 | Japan | A04N 5/783 |
| 1-281441 | 11/1989 | Japan | G03B 27/46 |

*Primary Examiner*—Victor R. Kostak
*Assistant Examiner*—John W. Miller

[57] ABSTRACT

A system to form reduced data for indexing use classified according to specific groups. A digital still camera records image data corresponding to a photographed subject, in frame units on a recording medium, and includes a classification unit to classify the image data corresponding to the photographed subjects into specific groups and a recording control to record image data corresponding to plural frames of the specific groups classified by the classification unit.

19 Claims, 11 Drawing Sheets

FRAME 1  FRAME 2  FRAME 3  FRAME 4

INDEX PICTURE A

INDEX PICTURE B

FRAME 1  FRAME 2  FRAME 3  FRAME 4

FRAME 5

INDEX PICTURE C

INDEX PICTURE D

FRAME 1  FRAME 2

FRAME 3  FRAME 4

REDUCED IMAGE

FRAME 1  FRAME 2

FRAME 3  FRAME 4

REDUCED IMAGE

FRAME 1 FRAME 2 FRAME 3 FRAME 4
FRAME 5 FRAME 6 FRAME 7 FRAME 8

INDEX PICTURE 1

INDEX PICTURE 2

IMAGE PROCESSING SYSTEM FOR CLASSIFYING REDUCED IMAGE DATA

This application is a continuation of application Ser. No. 08/164,225, filed Dec. 7, 1993, now abandoned.

BACKGROUND OF THE INVENTION

1. Field of the Invention

The present invention relates to a digital still camera which reduces photographed images and forms reduced image data for indexing use.

2. Description of the Related Art

Digital still cameras are known wherein photographed image data is recorded, without compression or alteration of the data. Further, digital still cameras are known wherein the photographed image data is compressed and recorded as frame units on a recording medium such as a memory card.

In order to provide confirmation of the kind of image data which is stored on a memory card, typically one image frame at a time is played back and displayed on a monitor or the like. However, when there are many frames of image data recorded on a memory card, the time required to display and confirm one picture at a time becomes long. In the future, when the capacity of the memory card increases and, as a result, the amount of image data which can be stored is increased, it will be required that the time for playback and display of image data (i.e, the indexing time) be shortened.

It is possible to shorten the indexing time by reducing the photographed image data and by displaying plural reduced images at the same time. When forming reduced image data for playback and display, i.e, indexing, generally, the images which are recorded in the memory card are reduced serially, one image frame at a time. For example, as seen in FIG. 9B, when forming reduced image data for indexing use, four frames can be displayed at one time. When forming a first indexing picture, the image data corresponding to the 1st frame through the 4th frame in the memory card are reduced and, when forming a second indexing picture, the image data corresponding to the 5th frame through the 8th frame in the memory card are reduced. Subsequent reduced image data for indexing use are similarly formed in turn.

However, as seen in FIG. 10A and FIG. 10B, the image data includes not only image data corresponding to frames photographed at the usual camera attitude (i.e., with the camera in an upright position), but also image data corresponding to frames which have been photographed at a camera attitude inclined 90° to the right or to the left from the upright position. When the image data is reduced one image frame at a time, as in the prior art, the image data corresponding to a photograph taken with the camera in the upright position poses no particular problem when forming reduced image data for indexing. However, as shown in FIG. 10B, when the direction of image data corresponding to a photograph taken at camera attitudes of 90° to the left or to the right from the upright position (sideways position photography), the indexing picture becomes more difficult to view.

Further, according to the prior art, when continuous photography is performed, and the reduced image data for indexing use is formed in turn, the image data corresponding to the successive photographs taken during continuous photography may be formed across two reduced images, and therefore the continuous photographs are difficult to view. For example, as shown in FIGS. 11A–11C, the 2nd frame through the 5th frame of image data recorded on the memory card correspond to pictures taken in the continuous photography mode. When three frames (FRAMES 2–4) are formed in the first reduced image (INDEX PICTURE 1) as shown in FIG. 11B, and one frame (FRAME 5) is formed in the second reduced image (INDEX PICTURE 2), as shown in FIG. 11C, the progression of the sequence of continuous photographs is difficult to view and to understand.

Furthermore, it is desirable for the photographs to be rearranged according to event, date, etc., after they have been photographed, in order to easily view the photographs.

SUMMARY OF THE INVENTION

It is therefore an object of the present invention to provide an image processing system which forms reduced image data for indexing use and which classifies the reduced image data into specific groups.

It is another object of the present invention to provide an image processing system which forms reduced image data for indexing such that the image data may be easily viewed when displayed.

It is a further object of the present invention to provide an image processing system which forms reduced image data for indexing such that photographs taken at different camera attitudes are displayed uniformly.

It is yet a further object of the present invention to provide an image processing system which forms reduced image data for indexing such that photographs taken during continuous photography may be easily viewed on a display.

It is another object of the present invention to provide an image processing system which forms reduced image data for indexing such that photographs classified according to time information may be easily viewed when displayed.

Additional objects and advantages of the present invention will be set forth in part in the description which follows, and, in part, will be obvious from the description, or may be learned by practice of the invention.

The above objects of the present invention are achieved by providing a digital still camera to record, in frame units on a recording medium, digitalized image data of a photographic subject imaged by an imaging unit. A classification unit classifies the image data corresponding to the imaged subject. The classification unit includes: an attitude detection unit to detect the attitude of the camera; a continuous photography detection unit to detect a continuous photography mode; and a time information detection unit to detect photographed time information. The classification unit classifies the frames photographed with the same attitude into specific groups; classifies a number of frames photographed successively in a continuous photography mode into specific groups; and, classifies plural frames having the same time information into specific groups.

A recording control unit reduces and records, in recording regions allotted to frame units, the image data of plural specific groups classified by the classification unit. The recording control unit acts when a predetermined number of frames have been photographed, and when the image data stored in the recording medium has reached a predetermined recorded quantity. The recording control unit includes a compression ratio control unit to set the compression ratio greater than the compression ratio to record image data with no reduction when recording reduced image data on the recording medium.

In operation, the plural frames classified according to predetermined groups by the classification unit are reduced and recorded within one image. For example, when the grouping of reduced images is performed according to the attitude of the camera at the time of photography, the images photographed in the continuous photography mode are reduced, and collected in one image.

Reduced image data for indexing use are automatically formed when a predetermined number of frames have beer photographed, or when a predetermined number of images have been recorded on the recording medium.

BRIEF DESCRIPTION OF THE DRAWINGS

These and other objects and advantages of the invention will become apparent and more readily appreciated from the following description of the preferred embodiments taken in conjunction with the accompanying drawings, of which.

DESCRIPTION OF PREFERRED EMBODIMENTS

Reference will now be made in detail to the present preferred embodiments of the invention, examples of which are illustrated in the accompanying drawings.

Figure 1:
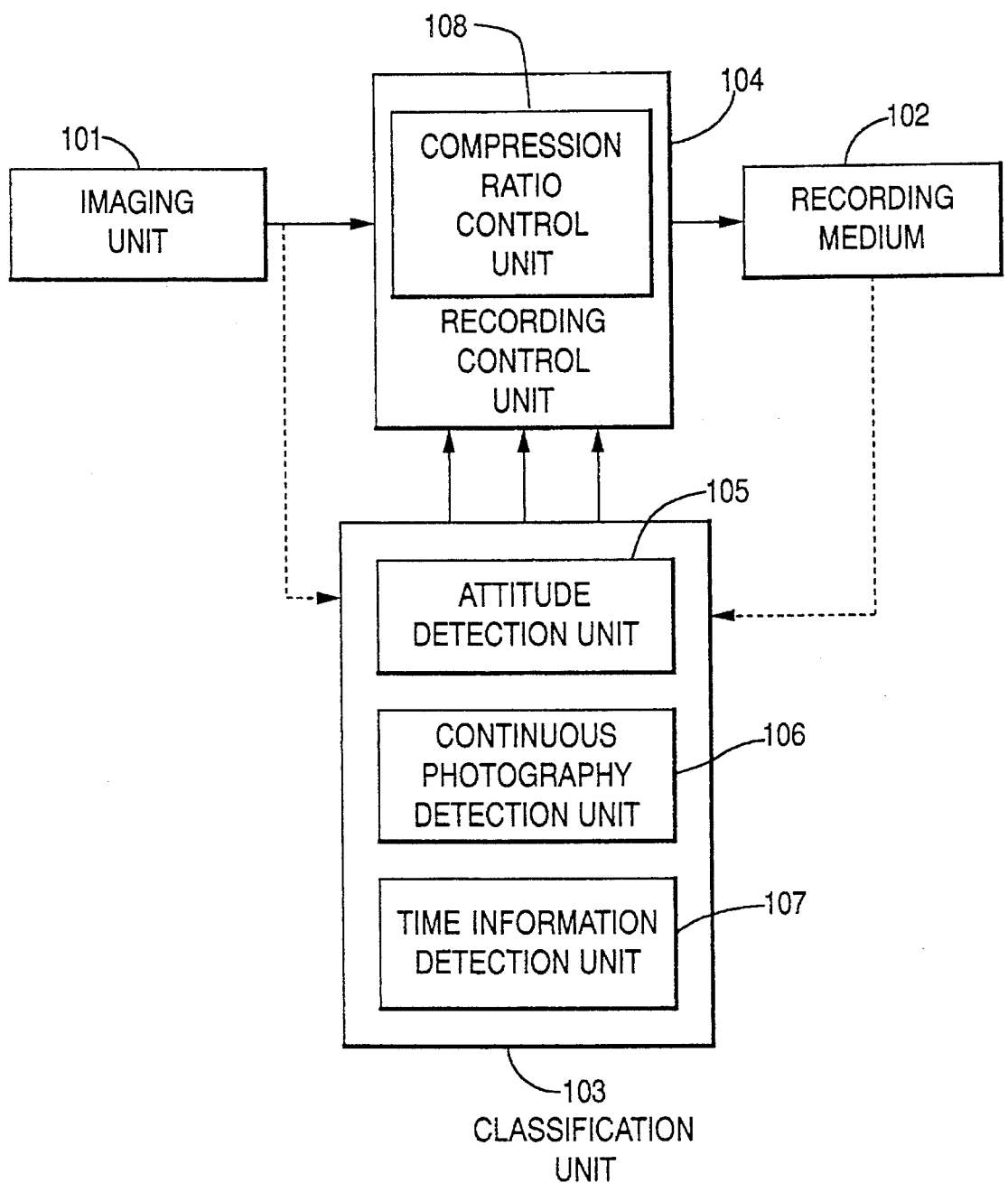
FIG. 1 is a block diagram of a system for reducing image data and classifying the image data for storage in accordance with a ;preferred embodiment of the present invention.

FIG. 1 is a functional block diagram of an image processing system in accordance with the present invention. An imaging unit 101 provides a digital image of a photographic subject which has been imaged by the imaging unit 101. A classification unit 103 is provided with classifies the image data corresponding to the photographic subject. The classification unit includes an attitude detection unit 105 to detect the attitude of the camera, a continuous photography detection unit 106 to detect a continuous photography mode, and a time information detection unit 107 to detect photographed time information. The classification unit 103 classifies the frames photographed with the same attitude into specific groups. The classification unit 103 also classifies a number of frames photographed successively in a continuous photography mode into a specific group, and classifies plural frames having the same time information into another group.

A recording control unit 104 reduces the image data and records the image data corresponding to the specific groups classified by the classification unit 103 according to the output of the classification unit 103. The recording control unit 104 includes a compression ratio control unit to set a compression ratio for the image data. Reduced image data for indexing use are automatically formed when a predetermined number of frames have been photographed, or when a predetermined number of images have been recorded on a recording medium 102.

Figure 2:
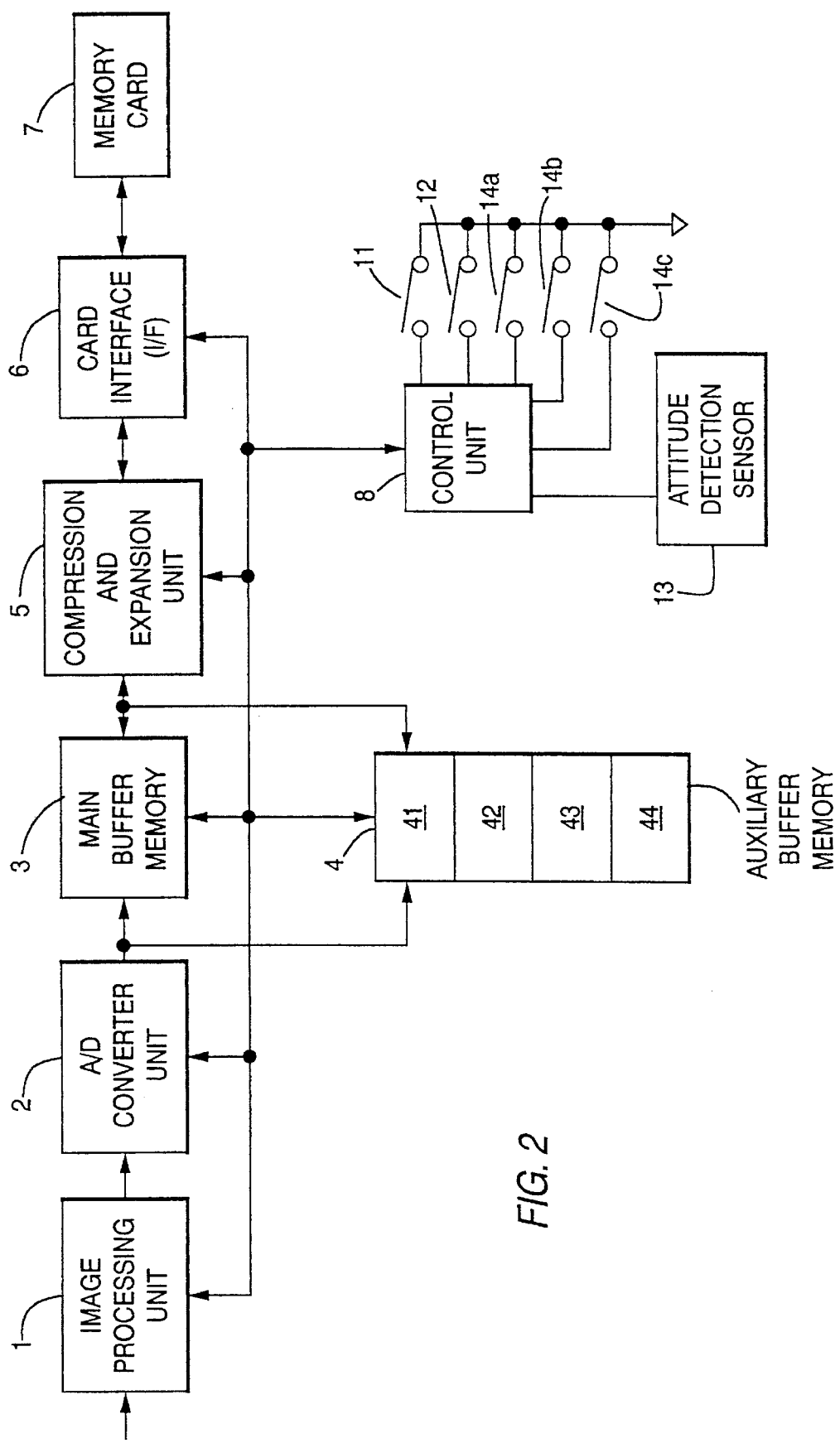
FIG. 2 is a block diagram showing circuitry in a digital camera in accordance with the preferred embodiment of the present invention.

FIG. 2 is a block diagram of circuitry which may be employed in a digital still camera in accordance with a preferred embodiment of the present invention. Light from a photographic subject is imaged upon an image processing unit 1 via a lens (not shown), a shutter (not shown), and a stop (not shown) which controls the exposure. The image processing unit 1 includes charged coupled devices (CCDs) and like photoelectric conversion elements which convert the light from the photographic subject into electrical signals. The image processing unit 1 performs gamma conversion and like signal processing on the electrical signals and analog image signals are output. The analog image signals output by the image processing unit 1 are supplied to an analog-to-digital (A/D) converter unit 2 where the analog signals are digitized. The digitized image signals are then stored as image data in a main buffer memory 3 and an auxiliary buffer memory 4.

In accordance with the preferred embodiment, a region to store the information for one frame of image data is disposed in the main buffer memory 3. The auxiliary buffer memory 4 includes four storage regions 41–44 each of which are arranged to respectively store four reduced frames of image data. Region 41 stores reduced images grouped according to continuous photography; region 42 stores reduced images grouped according to upright position photography; region 43 stores reduced images grouped according to sideways position photography (i,e., pictures taken when the camera is rotated 90° to the right or to the left from the upright position); and, region 44 stores reduced images grouped according to the order of photography. Image data is reduced and recorded according to the above-described groupings in the respective regions 41–44 in the auxiliary buffer memory 4 to form reduced index pictures, as will now be described below.

Image data is stored in the main buffer memory 3 as single frames. In order to form reduced image data in the respective regions 41–44 of the auxiliary buffer memory 4, a predetermined proportion of the image data is culled out (i.e., removed from the image data) by the control unit 8 to form reduced image data for a storage in auxiliary buffer memory 4. For example, in order to record four frames reduced for storage in auxiliary buffer memory 4 within the recording region of one frame, each of the four frames may be reduced by one-half in the height and width directions. Specifically, the data being read from the main buffer memory 4 is culled out by reading out the data in a proportion of one-to-two in the height and width direction, respectively, and storing the read out data in the auxiliary buffer memory 4. The image data stored in either the main buffer memory 3 or the auxiliary buffer memory 4, are compressed in the compression and expansion unit 5, and the compressed image data is recorded via a card interface (I/F) 6 on the memory card 7. A control unit 8 controls the action of the circuitry in the camera and includes a CPU, microprocessor or similar control circuitry.

A group of switches 11–14 and a sensor 13 are connected to the control unit 8 and provide input signals to the control unit 8. Specifically, a release switch 11 is connected to a release button (not shown) and inputs a release signal to the control unit 8. A continuous photography mode selection switch 12 is operated when performing continuous photography. An attitude detection sensor 13 detects the attitude of the camera. A group of classification switches 14a–14c select a mode by which reduced images are classified. Specifically, a selection switch 14a selects a mode to prepare reduced images classified according to the order of photography. A switch 14b selects a mode to prepare reduced images classified according to the attitude detected by the attitude detection sensor 13. When switch 14b is operated, a reduced image corresponding to a subject photographed in the upright position (see FIG. 5A), and reduced images corresponding to subjects photographed at attitudes turned through 90° to the right or to the left of the upright position (see FIGS. 5B and 5C, respectively), are classified as separate reduced images A selection switch 14c selects a mode to prepare reduced images classified according to continuous photography.

A processing sequence for preparing reduced image data for indexing use during photography will now be described with reference to the flow chart of FIG. 3. The processing sequence begins in step S0 when a release operation is performed. Next, in step S1, a photographic process is performed and the to light from a photographic subject is converted to electrical signals and stored as image data by the image processing unit 1. Next, in step S2, it is determined whether or not any of the group of classification switches 14a–14c have been actuated. If the determination in step S2 is affirmative, the processing sequence proceeds to step S3, and the image data are read out from the image processing unit 1, digitized by the A/D converter 2, and stored in the main buffer memory 3. In addition, in step S3 the image data are stored, while being culled out, in a region 41–44 within the auxiliary buffer memory 4 which corresponds to the state of the classification switches 14a–14c, as will be described in detail below with reference to FIG. 4. However, when step S2 is negative, the processing sequence proceeds to step S4 and the image data read out from the image processing unit 1 and digitized by A/D converter 2 are stored only in the main buffer memory 3.

Continuing, in step S5, the image data stored in the main buffer memory 3 are compressed by the compression and expansion unit 5, and are recorded on the memory card 7 via the card interface 6. Proceeding to step S6, it is determined whether a predetermined number of frames (for example, four frames) of image data are stored in the respective regions 41–44 of the auxiliary buffer memory 4. Specifically, it is determined whether any of the variables L, M, N and P, which represent the number of frames of image data stored in regions 41, 42, 43 and 44, respectively, of auxiliary buffer memory 4, are greater than or equal to four. When any of the variables L, M, N or P is greater than or equal to four, this indicates that the corresponding region of auxiliary buffer memory 4 is full. When step S6 is affirmative, the processing sequence proceeds to step S7 where the image data stored in the regions of the auxiliary buffer memory 4 which were determined to be full in step S6, is compressed and stored in the memory card 7. The variables L, M, N and P, respectively, are reset when the corresponding buffer memory region is determined to be full and is stored in the memory card 7. The processing sequence then ends. However, when step S6 is negative, the processing sequence proceeds to step S8 where it is determined whether continuous photography has ended. When it is determined that continuous photography has ended, the processing sequence proceeds to step S7, and the image data stored in the region 41 of the auxiliary buffer memory 4, which stores the reduced images grouped according to continuous photography, is compressed and stored in the memory card 7.

According to the prior art, when storing image data grouped according to continuous photography, when, for example, a first continuous photography operation ends in three frames, the first frame of a second continuous photography operation is reduced and stored in a region corresponding to the fourth frame of the first continuous photography operation. Therefore, the image stored in the fourth frame region is out of sequence with other continuous photographs and is difficult to view. In accordance with the present invention, after each respective continuous photography operation has ended, the image data stored in the region 41 of the auxiliary buffer memory 4, which stores reduced image data grouped according to continuous photography, are stored in the memory card 7. During the next continuous photography operation, reduced images are stored in a first frame region in the continuous photography group image region 41.

In order to replay the data stored in memory card 7, the compressed image data recorded on the memory card 7 are expanded by the compression and expansion unit 5, and are stored in the main buffer memory 3 or in the auxiliary buffer memory 4. The image data stored in the main buffer memory 3 or in the auxiliary buffer memory 4 can be confirmed by outputting the image data to a monitor, printer or the like (not shown). Furthermore, it is possible for the photographed image to be confirmed in a viewfinder or the like (not shown), to which there is an output from the main buffer memory 3 or auxiliary buffer memory 4 at the time of recording.

Figure 3:
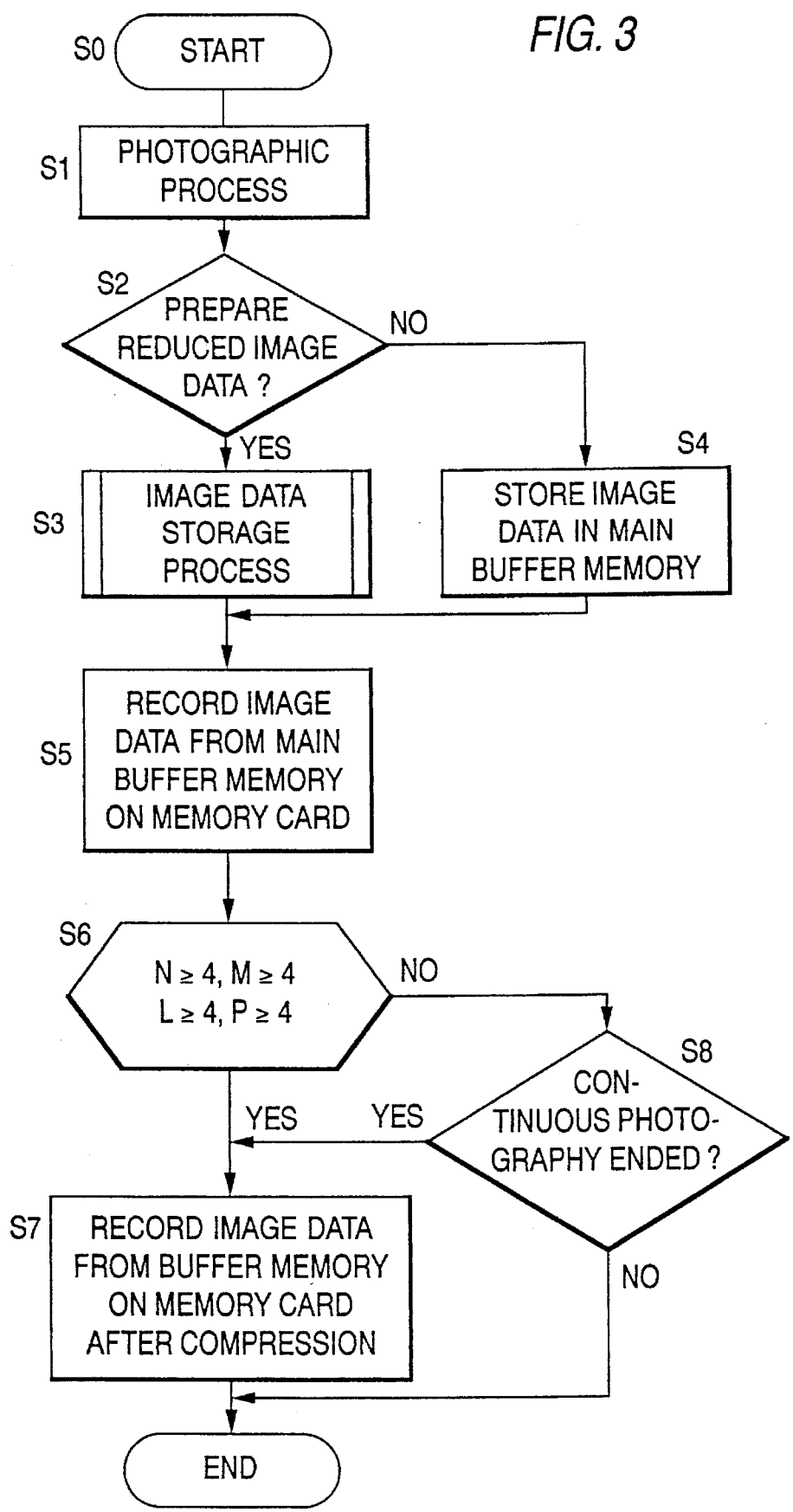
FIG. 3 is a flow chart showing an example of a procedure for preparing reduced image data in accordance with the preferred embodiment of the present invention.
Figure 4:
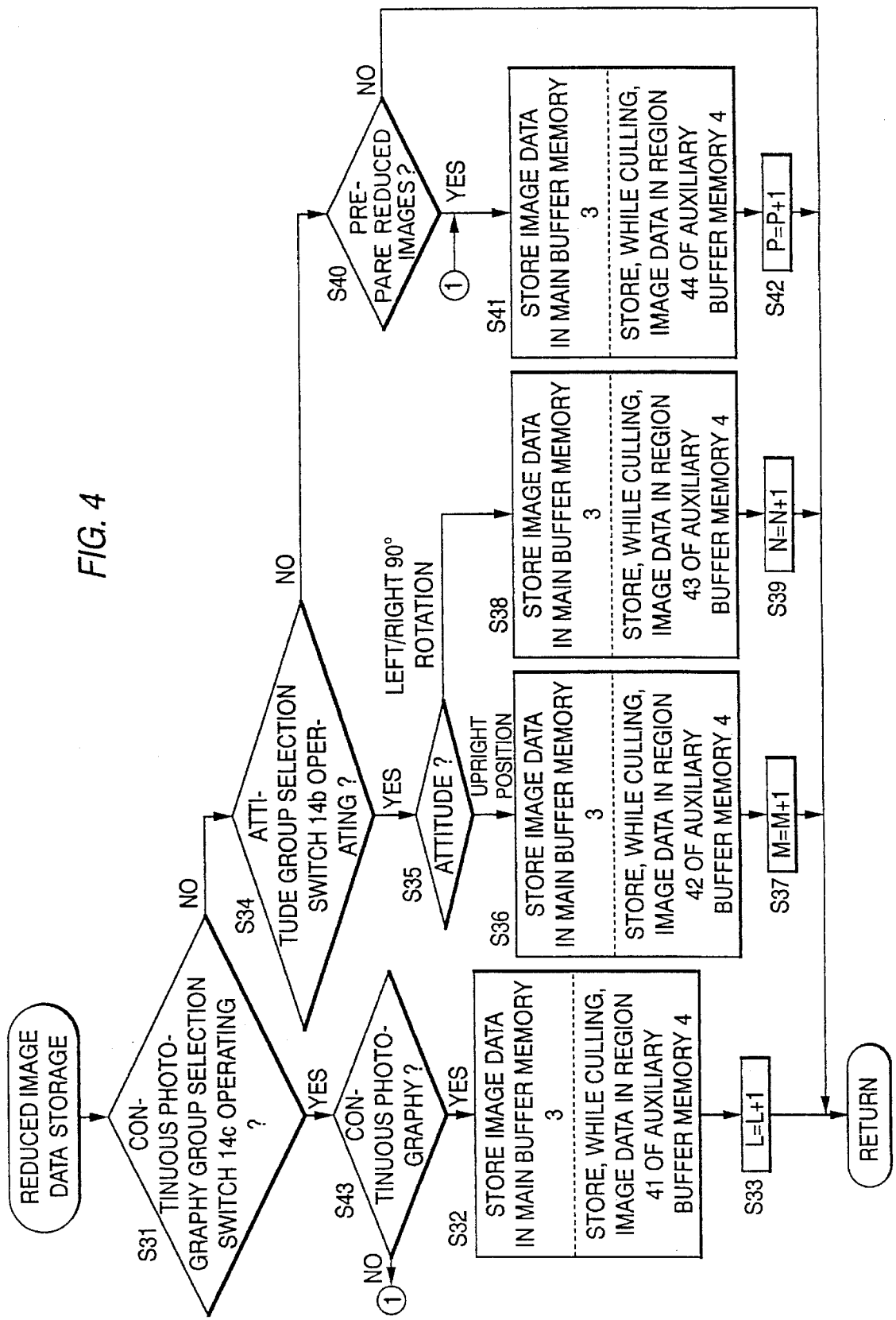
FIG. 4 is a flow chart showing an example of a image data storage process in accordance with the preferred embodiment of the present invention.

FIG. 4 is a flow chart showing an example of a processing sequence for performing image data storage which details the operations performed in step S3 of FIG. 3. As described below, the image data is stored according to the state of the classification switches 14a–14c.

In step S31, it is determined whether the classification switch 14c is operating, which selects a mode to prepare reduced images grouped according to continuous photography. When the determination in step S31, is affirmative, the processing sequence proceeds to step S43, where it is determined whether or not the photography mode is set in the continuous photography mode. If the mode of photography is set in the continuous photography mode, the processing sequence proceeds to step S32. In step S32, image data is recorded in the main buffer memory 3. In addition, the image data, while being culled out, is reduced and recorded in a first region of the memory region 41 (in this example it is possible to record the image data of four reduced frames in each respective region 41–44 of auxiliary buffer memory 4). Next, in step S33 the variable L, corresponding to the number of reduced frames stored in region 41, is incremented by 1 and the processing sequence returns to the main processing sequence shown in FIG. 3. When the determination in step S31 is negative, and the continuous photography classification switch 14c is not operating, the processing sequence proceeds to step S34 where it is determined whether the attitude classification switch 14b is operating which selects a mode to prepare reduced images grouped according to camera attitude. When the determination in step S34 is affirmative, indicating that the switch 14b is operating, the control process proceeds to step S35.

Figure 5A:
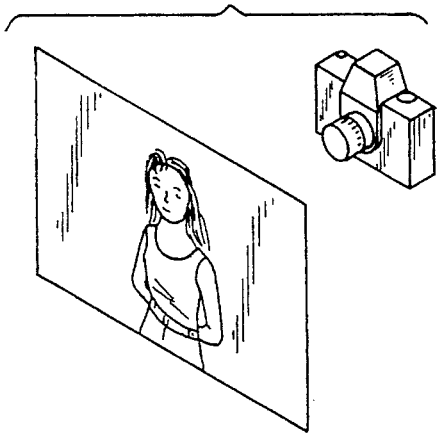
FIGS. 5A–5C show a camera and resulting photographs corresponding to photography performed with the camera attitude at an upright position, and at a positions rotated 90° to the right and to the left of the upright position.

In step S35, the attitude of the camera at the time of photography is determined based upon the output of the attitude sensor 13. If the camera is in the upright position, as shown in FIG. 5A, the processing sequence proceeds to step S36. In step S36, image data is recorded in the main buffer memory 3, and, additionally, the image data, while being culled out, is stored in region 42 of the auxiliary buffer memory 4 which stores reduced images grouped according to upright position photography. Next, in step S37, the variable M, corresponding to the number of reduced frames stored in region 42, is incremented by 1 and the processing sequence returns to the main sequence shown in FIG. 3.

Figure 5B:
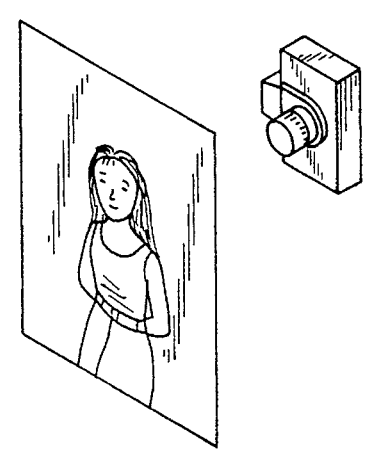
Figure 5C:
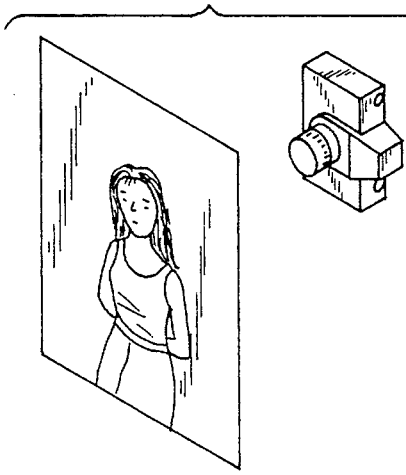

When it is determined in step S35 that the attitude of the camera during photography is at a sideways position in which the camera is turned through 90° to the right or to the left from the upright position, as shown in FIG. 5B or FIG. 5C, respectively, the photographed image data, while being culled, is stored in the region 43 of the auxiliary buffer memory 4 which stores reduced images grouped according to sideways position photography. For example, as seen in FIG. 5B, when the camera has been rotated through 90° to the right from the upright position, image data corresponding to photography in this position is stored, while being culled out, in the region 43. However, when the camera has been rotated through 90° to the left from the upright position, as seen in FIG. 5C, the image data, while being culled out, is rotated through 180° and stored in the region 43. The rotation of the image is a process which orients the reduced pictures for indexing use in the same orientation, since their orientation differs by 180° when the camera is rotated 90° to the left or to the right from the upright position. Next, in step S39, the variable N, corresponding to the number of reduced images stored in region 43, is incremented by 1 and the processing sequence returns to the main sequence shown in FIG. 3.

When it is determined in step S34 that the attitude classification switch 14b is not in operation, the processing sequence proceeds to step S40 where it is determined whether the classification switch 14a is operating, which selects a mode to prepare reduced images grouped according to order of photography. If it is determined that the switch 14a is in operation, the processing sequence proceeds to step S41. In step S41, the image data is recorded in the main buffer memory 3, and, in addition, the image data, while being culled, is stored in the region 44 of the auxiliary buffer memory 4 which stores reduced images grouped according to order of photography. Next, in step 42, the variable P, corresponding to the number of frames of reduced images stored in region 44, is incremented by 1 and the processing sequence returns to the main processing sequence shown in FIG. 3.

If the continuous photography mode was not the mode of photography determined in step S43, the processing sequence proceeds to step S41, and image data is stored in region 44 of the auxiliary buffer memory 4 grouped according to order of photography.

The operation of the system described above will now be described in further detail for the situation in which the classification selection switch 14b is operating which selects reduced images for storage grouped according to camera attitude.

Photography is generally performed with the camera in the upright attitude as shown in FIG. 5A. However, photography is also performed with the camera rotated through 90° to the right or to the left from the upright position, in a sideways position, as shown in FIGS. 5B and 5C, respectively. When forming the reduced image data for indexing use, the reduced image data for the subjects photographed with the camera at the attitudes corresponding to FIG. 5B or 5C are prepared separately from the reduced image data for the subjects photographed with the camera in the attitude corresponding to that shown in FIG. 5A.

Figure 6A:
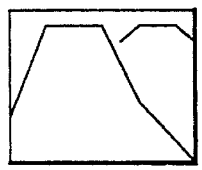
FIGS. 6A–6C show image frames grouped according to photographic attitude in accordance with the preferred embodiment of the present invention.
Figure 6A:
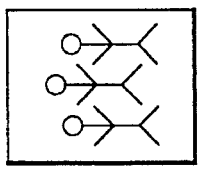
Figure 6A:
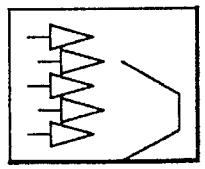
Figure 6A:
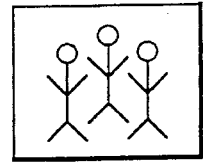

For example, as seen in FIG. 6A, the 1st frame and the 4th frame show frames photographed at a camera attitude corresponding to that shown in FIG. 5A (upright position photography). The 2nd frame shows a frame photographed at a camera attitude corresponding to the attitude of the camera shown in FIG. 5B (camera attitude rotated 90° to the right from the upright position), and the 3rd frame shows a frame photographed at a camera attitude corresponding to the attitude of the camera shown in FIG. 5C (camera attitude rotated 90° to the left of the upright position). The reduced image data corresponding to the 1st frame and the 4th frame are prepared as the reduced index picture A shown in FIG. 6B. The reduced image data corresponding to the 2nd frame and the 3rd frame are prepared as the reduced index picture B shown in FIG. 6C. In order to prepare index picture B, it is necessary for the images corresponding to the 2nd frame and the 3rd frame to be rotated. Because the images have been converted into digital signals, rotation of the images is easily performed by controlling the addresses when they are written into the buffer memory. By rotating the images such that they are formed in uniform direction, the reduced index pictures are easy to view, even if the attitude of the camera is rotated to the left or to the right, and, therefore the images are easy to view.

The operation of the system described above will now be described in further detail for the situation in which the classification selection switch 14c is operating which selects reduced images for storage grouped according to continuous photography.

Figure 7A:
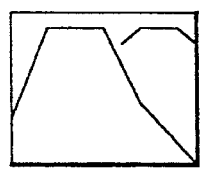
FIGS. 7A–7C show image frames grouped according to continuous photography in accordance with the preferred embodiment of the present invention.
Figure 7A:
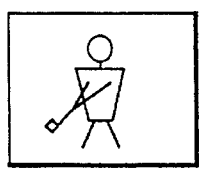
Figure 7A:
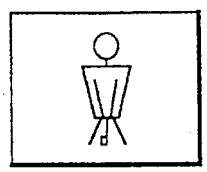
Figure 7A:
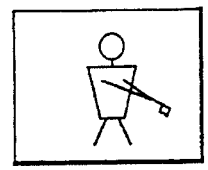
Figure 7A:
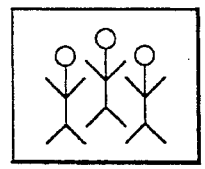
Figure 7B:
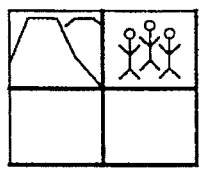
Figure 7C:
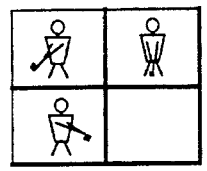

When the classification selection switch 14c is operating, the reduced image data for indexing use correspond to continuously photographed images. For example, as seen in FIG. 7A, the 1st frame and the 5th frame are frames which have been photographed one at a time in a single frame photography mode, while the 2nd frame through 4th frame are frames which have been photographed in the continuous photography mode. According to this example, the reduced image data for indexing use corresponding to the 1st frame and 5th frame are prepared as reduced index picture C, as shown in FIG. 7B, and the reduced image data for indexing use corresponding to the 2nd frame through 4th frame are prepared as reduced index picture D which groups the frames photographed in the continuous photography mode, as shown in FIG. 7C. By preparing the reduced image data in this manner, the progression of the photographs taken in the continuous photography mode can be seen and easily recognized.

Figure 6B:
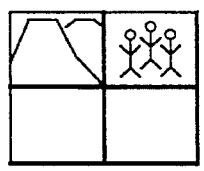
Figure 6C:
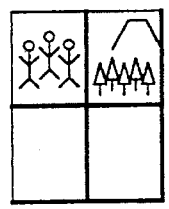

When the indexing pictures are reduced and stored in single frame recording regions as shown in FIGS. 6B and 6C and in FIGS. 7B and 7C, the sequence numbers of the images become scattered and are difficult to view. By recording the original frame numbers above the reduced images, the frame numbers to which the reduced images correspond can be recognized with ease.

According to the above description, during the preparation of the reduced images, the reduced images which are stored in regions 41–44 of the auxiliary buffer memory 4 were prepared at the same time as the photograph. However, once the photographed image data has been recorded on the memory card 7, the system may be adapted to prepare the reduced pictures for indexing by reading out only the compressed image data photographed at the attitudes shown in FIGS. 5B and 5C. If the system is so adapted, it is not necessary to establish the sideways position reduced image region 43 in the auxiliary memory 4. Similarly, if the reduced image data for indexing use are formed after the end of continuous photography by reading out from the memory card 7 the image data corresponding to only continuous photography, it is not necessary to establish the continuous photography reduced image region 41 in the auxiliary buffer memory 4.

Further, when performing continuous photography for five frames or more, the capacity of the auxiliary buffer memory region 41 for storing reduced images grouped according to continuous photography is four frames, the reduced image data stored in the region 41 of the auxiliary buffer memory 4 may be recorded in the memory card 7 between the compression of the 4th frame and the 5th frame. The 5th frame and later frames may be prepared as reduced images at the same time as photography.

However, if time does not allow data to be recorded in the memory card 7 between the 4th and the 5th frames, the image data stored in the main buffer memory 3 are compressed in the compression and expansion unit 5 and written on the memory card 7. When continuous photography ends, the compressed data corresponding to continuously photographed images are read out from the memory card 7, and the compressed data is expanded by the compression and expansion unit 5 in the same manner as in the case of the formation of the reduced image data for indexing use as described previously. The image data, while being culled out in some fixed proportion, are stored in the auxiliary memory 4. The reduced image data for indexing use are prepared by performing this action for a given number of frames. The reduced image data for indexing use are replayed and compressed by the compression and expansion unit 5, and may be recorded in the memory card 7 via the I/F card 6.

Further, when the power source of the camera is switched OFF at a time when the respective regions 41–44 of the auxiliary memory 4 are in a state such that the number of reduced images recorded has not reached a specified number of frames (four frames in this example), the reduced images stored in the auxiliary buffer memory 4 are compressed by compression and expansion unit 5 and temporarily stored on the memory card 7 at this time. Then, when the power source of the camera is switched ON, the compressed data temporarily stored in the memory card 7 are read out via the I/F card 6, data expanded by the compression and expansion unit 5, and the expanded data is stored in the auxiliary buffer memory 4. When photography is performed, image data is stored in the respective regions 41–44 of the auxiliary buffer memory 4 as reduced image data. In each region 41–44, images of four frames may be stored as the final reduced image data for indexing use, which are then transferred to the memory card 7.

Moreover, if there may be a change of the recorded images, such as any of the reduced pictures for indexing use, compression may be performed at a greater compression ratio during the compression of the usual image data. By making the compression ratio larger, the volume of compressed image data becomes smaller, and a large quantity of data may be written on the memory card 7 even if the memory space on memory card 7 is small.

Figure 8:
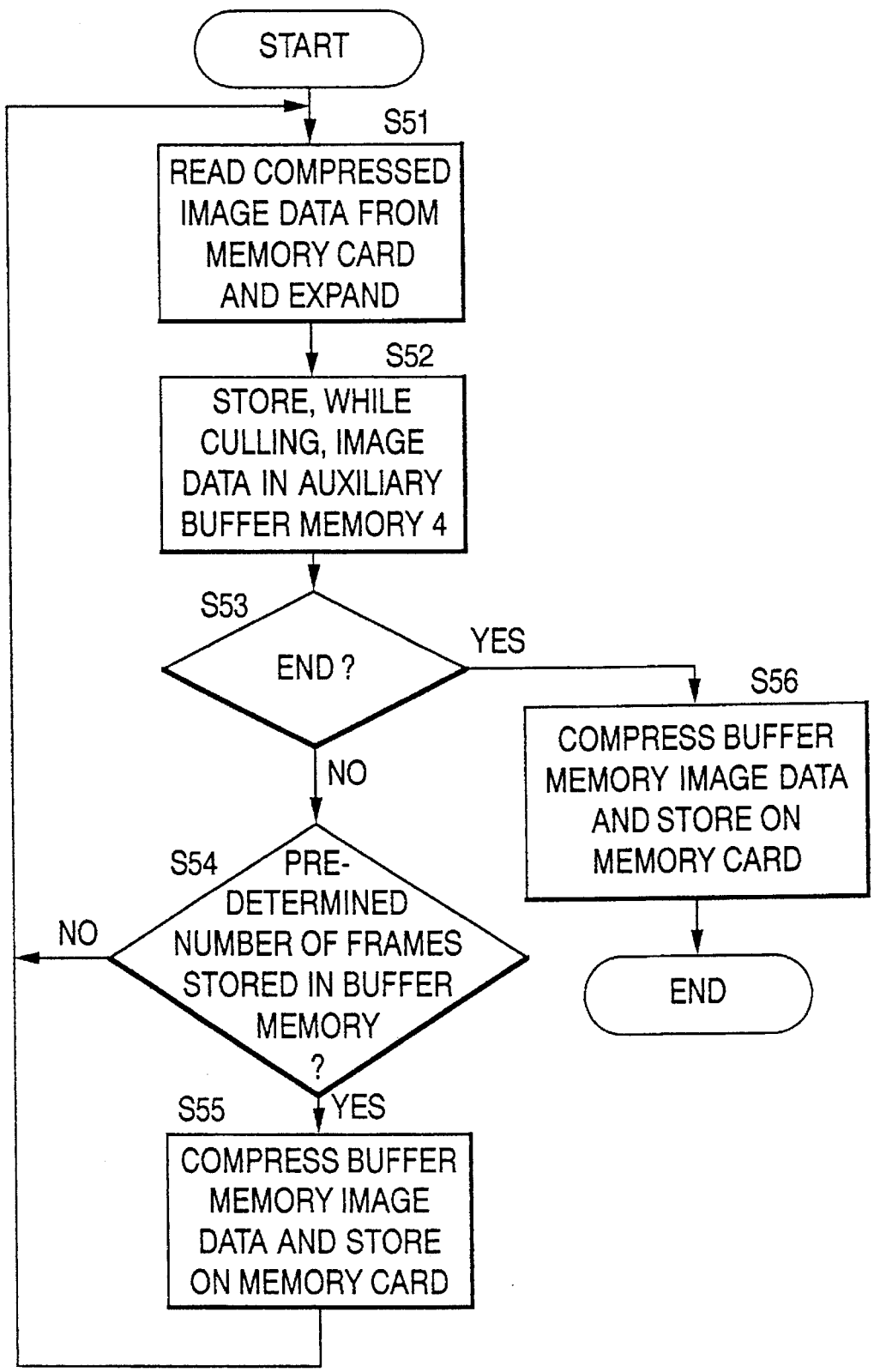
FIG. 8 is a flow chart showing an example of a process to prepare reduced image data from image data recorded on a memory card.
Figure 9A:
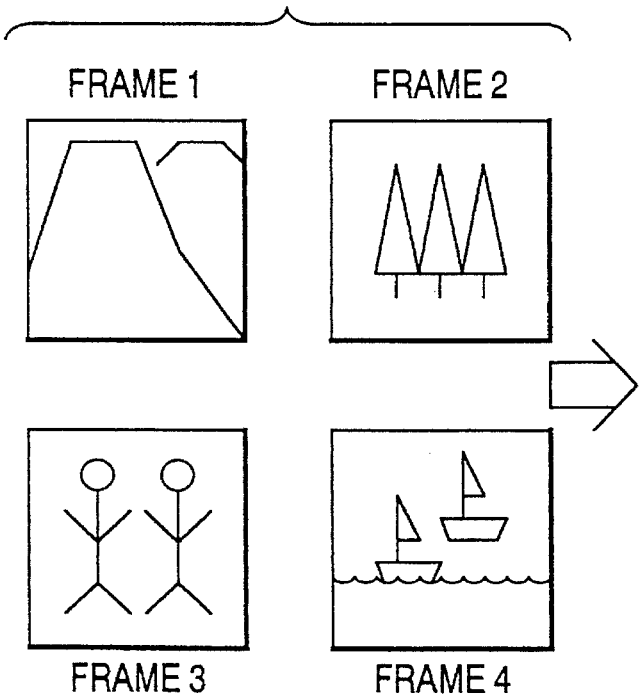
FIGS. 9A–9B show reduced images for indexing use.
Figure 9B:
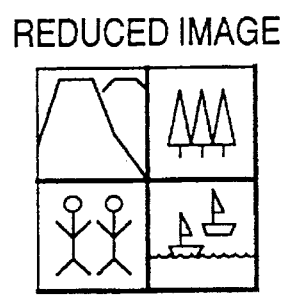
Figure 10A:
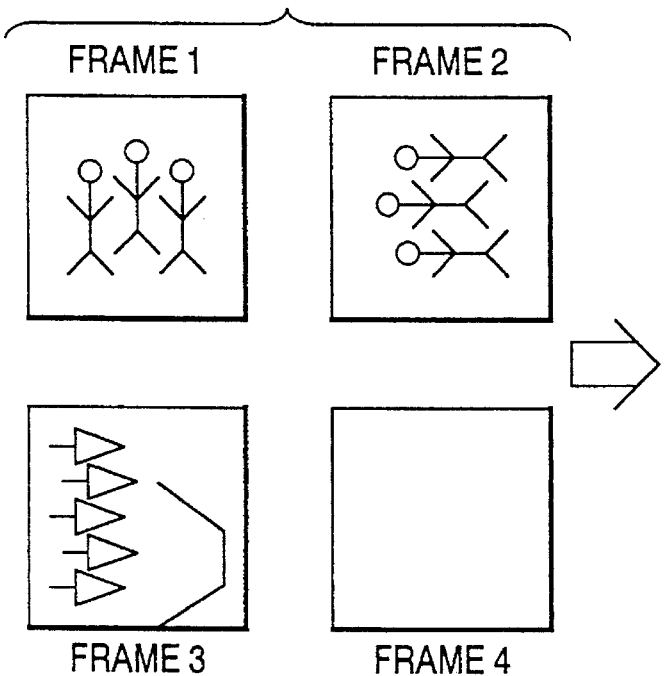
FIGS. 10A–10B show reduced images formed at different photographic attitudes.
Figure 10B:
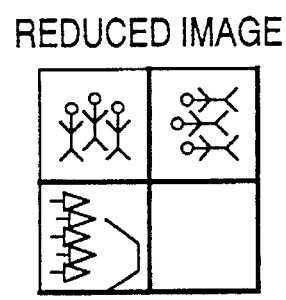
Figure 11A:
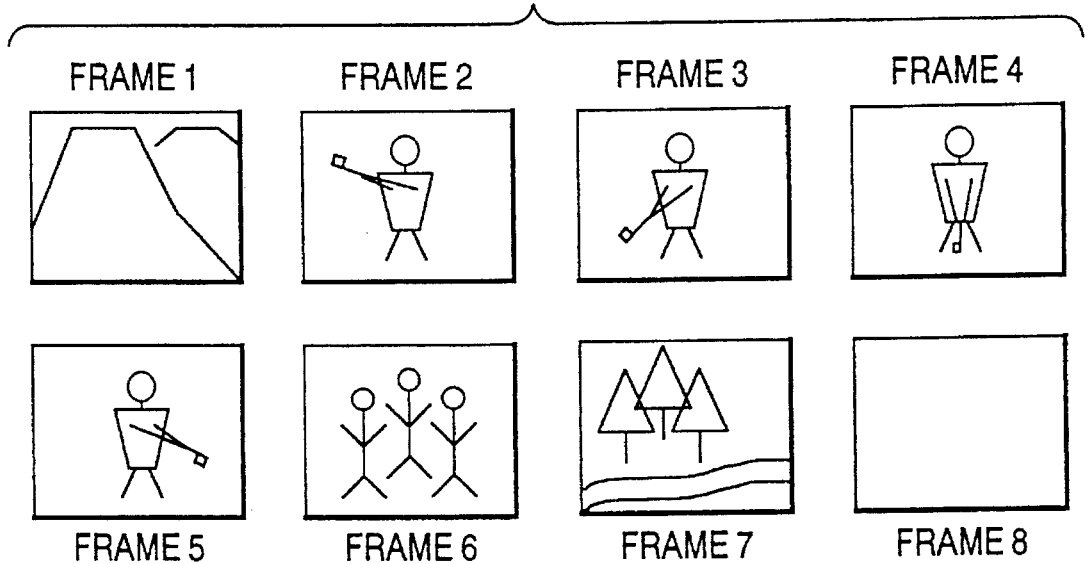
FIGS. 11A–11C show reduced images formed during a continuous photography operation.
Figure 11B:
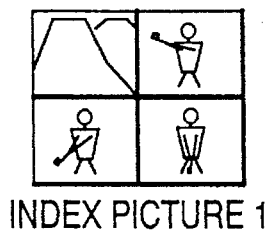
Figure 11C:
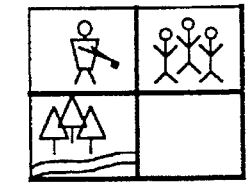

FIG. 8 is a flow chart showing an example of a processing sequence for preparing reduced image data for indexing use in which the compressed image data recorded on the memory card 7 are read out to prepare the reduced image data for indexing use. A memory region for storing four reduced image frames (one picture plane) is established in the auxiliary buffer memory 4.

Beginning in step S51, compressed image data are read out from memory card 7 and expanded by the compression and expansion unit 5 to prepare reduced image data for indexing use. For example, the image data read out from memory card 7 may be image data grouped according to the continuous photography mode, according to upright position photography, or according to sideways position photography. Next, in step S52, the expanded image data, while being culled out, are stored in the auxiliary buffer memory 4. Proceeding to step S53, it is determined whether all of the compressed image data stored in memory card 7, from which reduced image data is to be prepared for indexing use, has been read out from memory card 7. If all the images from which reduced image data is prepared have not been read out, the processing sequence proceeds to step S54.

In step S54, it is determined whether or not a predetermined number of frames of reduced image data for indexing use have been stored in auxiliary buffer memory 4. If the determination in step S54 is negative and the predetermined number of frames of reduced image data have not been stored, the processing sequence proceeds to step S51, and step S51 and the following steps are repeated. If the determination in step S54 is affirmative and the predetermined number of frames have been stored, the processing sequence proceeds to step S55, and the reduced image data for indexing use stored in the auxiliary buffer memory 4 is replayed, compressed, and recorded on the memory card 7. At this time, the image data in the auxiliary buffer memory 4 are erased. Then, proceeding to step S51, a similar procedure is repeated. However, if the determination in step S53 is affirmative and each of the images from which reduced image data is prepared have been read out from memory card 7, the processing sequence proceeds to step S56 where the reduced image data for indexing use in the auxiliary buffer memory 4 is replayed, compressed, and recorded on the memory card 7. The image data in the auxiliary buffer memory 4 is then erased and the processing sequence ends.

Figure 12:
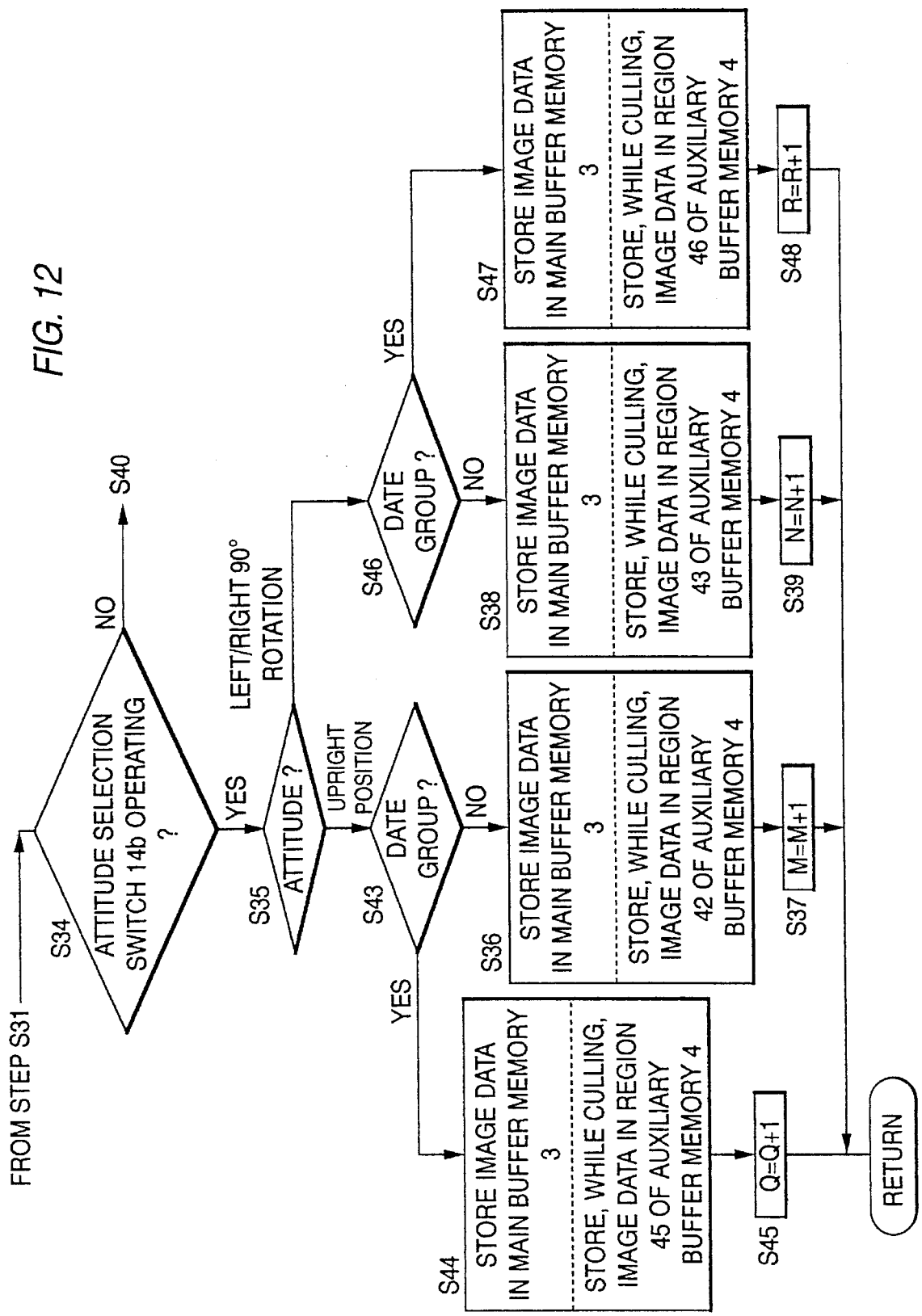
FIG. 12 is a flow chart showing an example of an image data storage process for images grouped into two or more kinds of groups in accordance with the preferred embodiment of the present invention.

FIG. 12 is a flow chart showing an example of a processing sequence for preparing reduced images which are divided into two or more kinds of groups. The steps which are the same as those shown in FIG. 4 are given the same reference symbols and their description is omitted. Further, the electrical circuitry for forming reduced images is the same as that shown in FIG. 2, except that two memory regions 45 and 46 are added to auxiliary buffer memory 4 as shown in FIG. 13.

The flow chart of FIG. 12 begins when step S31 in the processing sequence of FIG. 4 is negative and the processing sequence proceeds to step S34 (also seen in FIG. 4). The steps corresponding to the case when step S31 in FIG. 4 is affirmative, and step S34 is negative, are omitted.

In step S34, when the switch 14b is operated which selects a mode to classify reduced images according to camera attitude the processing sequence proceeds to step S35. When it is determined in step S35 that the camera attitude is upright, the processing sequence proceeds to step S43 where it is determined whether or not the image data includes a date group. When step S43 is affirmative, the processing sequence proceeds to step S44 and image data are recorded in the main buffer memory 3 and, in addition, image data are culled out and recorded in a region 45 of the auxiliary buffer memory 4. The variable Q, which is a variable indicating whether region 45 of buffer memory 4 is full, is incremented by 1 in step S45, and the processing sequence returns to the main routine of FIG. 3. However, when it is determined in step S35 that the camera attitude is at a position rotated 90° to the left or to the right of the upright position, the processing sequence proceeds to step S46 where it is detected whether the image data includes a date group. If step S46 is affirmative, the processing sequence proceeds to step S47, and image data are stored in the main memory 3 and, in addition, image data are culled out and recorded in the region 46 of the auxiliary buffer memory 4. In step S48, a variable R, which is a variable indicating whether region 44 of buffer memory 4 is full, is incremented by 1, and the program then returns to the main routine. The variables Q and R are reset when it is determined that the buffers 45 and 46, respectively, are full.

Figure 13:
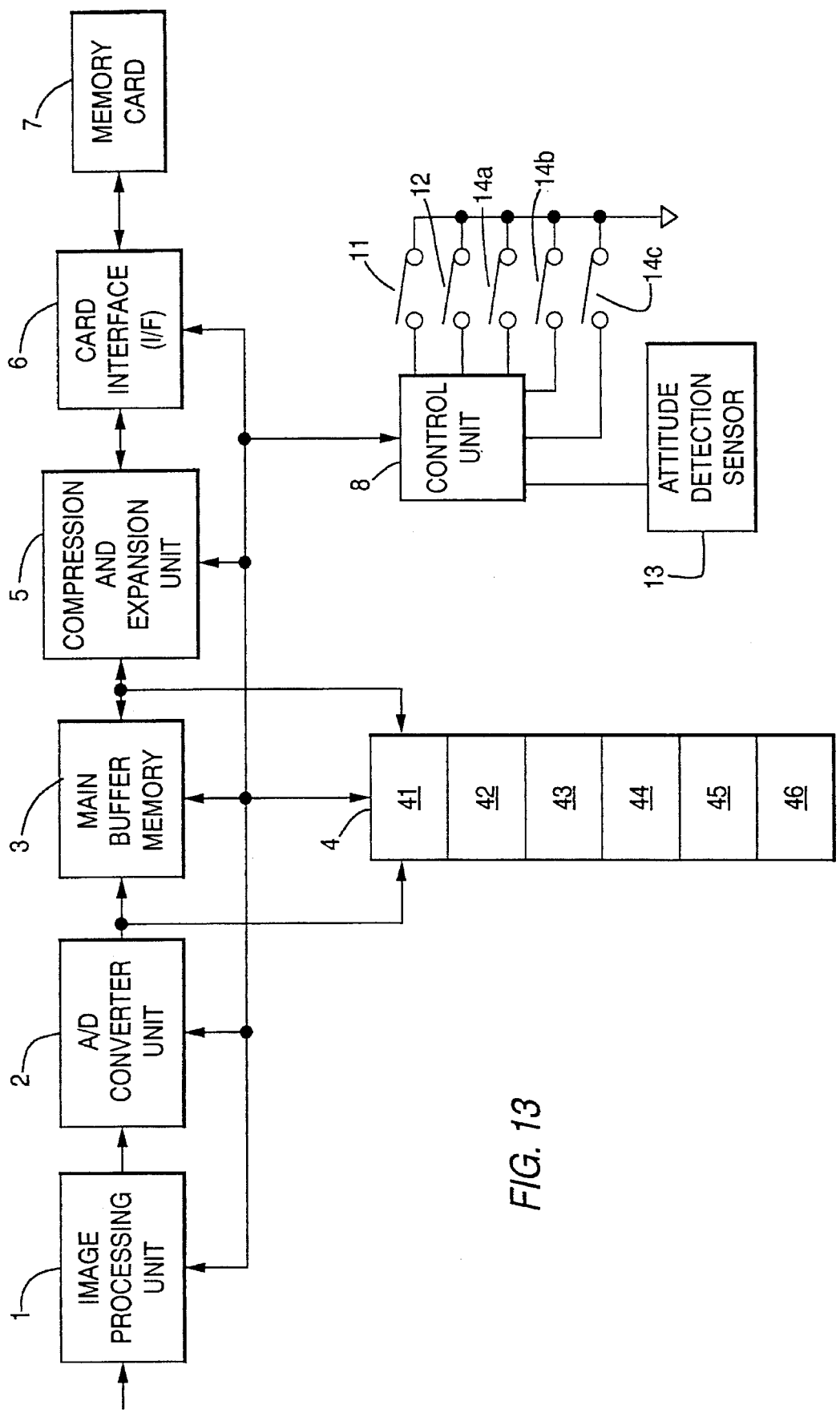
FIG. 13 is a block diagram showing circuitry in a digital camera in accordance with the preferred embodiment of the present invention.

Although the present invention has been described with respect to the variables L, M, N, P, Q and R assigned to six specific regions in the auxiliary buffer memory 4, it is not necessary to have six buffer memory regions as shown in FIG. 13. For example, in the process shown in FIG. 12 it is possible to assign the variables Q and R to the regions 41 and 44, respectively, thereby requiring only four memory regions in the auxiliary buffer memory 4. In general, by assigning different variables to different regions in buffer memory, a variety of groups of reduced image data may be formed without additional buffer memories.

According to the above procedure, frames photographed on the same date in an upright position attitude or at an attitude rotated 90° to the left or to the right can be divided into groups and prepared as reduced images.

Further, the photographed images may be grouped according to time information (year, month, day, hour, minute, second and the like), and reduced image data for indexing use may be formed according to these groups. For example, reduced image data for indexing are formed for each of an event on month M and day D, and an event on month M' and day D'. The reduced images may then be played back an displayed in a manner similar to prints photographed with a silver salt camera and pasted in an album, where each page groups pictures according to events.

The present invention has been described using an auxiliary buffer memory 4 in order to prepare reduced image data for indexing use. However, the auxiliary buffer memory 4 can be omitted, as will be described below.

The reduced image data for indexing use may be prepared in the main buffer memory 3. Specifically, after the compressed image data corresponding to a prescribed number of frames has been recorded on the memory card 7, the compressed image data is read out from the memory card 7 and expanded by the compression and expansion unit 5. The expanded image data are stored in the main buffer memory 3 while being culled out in some fixed proportion in the same manner as described previously. By performing this action for a predetermined number of frames, reduced image data for indexing use are prepared in the main buffer memory 3. The reduced data for indexing use are replayed and are data compressed in the compression and expansion unit 5, and are recorded via the card I/F on the memory card 7.

Further, although the present invention has been described with respect to reduced image data for indexing use being formed during photography, it may be that reduced image data may be automatically formed when a fixed capacity portion of image data are written on memory card 7. Specifically, when no vacant capacity for compressed image data exists on a portion of the memory card 7 which records reduced image data for indexing use, the reduced image data are automatically formed from the image data recorded up until this point.

Furthermore, although the present invention has been described wherein the photographed image data or reduced image data for indexing use were compressed and recorded on the memory card 7, the photographed image data or reduced image data may be recorded on the memory card 7 without compression. In this case, the data are not compressed by the compression and expansion unit 5, and uncompressed digital image data is recorded on the memory card 7 via the I/F card 6.

In the situation in which the reduced images are prepared, separated according to the date of photography corresponding to separate events, this does not mean that the reduced images are prepared at the same time. After the completion of photography, from among mixed frames of image data photographed on different dates, reduced images are prepared grouped by selecting frames having the same date or frames corresponding to the same event.

Furthermore, image data may be reduced and stored grouped according to a variety of photographic modes (e.g., program auto exposure (AE), shutter priority AE, stop priority AE, manual exposure mode, or sensitivity mode in which the output of a CCD can be controlled manually or automatically according to the amount and type of light available). Signals which represent the type of mode set are recorded in the memory card 7 with image frame data. The camera can form reduced images based upon the recorded mode data when a photograph is taken or after the photograph is taken. Alternatively, the reduced images may be formed by a player.

For example, reduced images may be formed which are grouped according to three modes (e.g., date, single shot mode, and program AE mode). The three modes may be retrieved by the camera and reduced images formed from the image data corresponding to all three modes.

Although preferred embodiments of the invention have been shown and described, it will be appreciated by those skilled in the art that changes may be made in these embodiments without departing from the spirit of the invention, the scope of which is defined in the appended claims and their equivalents.

What is claimed is:

1. An image processing system, comprising:

an image processing unit to produce digital image data corresponding to an imaged subject;

a memory card including plural regions to receive the digital image data and to store the digital image data in a respective one of the plural regions;

a reading unit to read the digital image data stored in the memory card automatically when the stored image data reaches a predetermined level;

a reducing unit to reduce the digital image data read by the reading unit and to produce a reduced digital image data; and a recording unit to record the reduced digital image data in the memory card.

2. An image processing system, as recited in claim 1, further comprising:

a compression unit to compress the reduced digital image data; and a recording unit to record the compressed reduced digital image data in the memory card.

3. An image processing unit, comprising:

an image processing device to generate digital image data representing a single frame image of an imaged subject;

a main buffer memory to receive and store the digital single frame image data;

a reducing unit to reduce the single frame image data;

an auxiliary buffer memory having plural storage regions to receive the reduced single frame image data and to store the reduced data in a respective region in the auxiliary buffer memory;

a compression and expansion unit to receive the digital image data from the main buffer memory and to compress the digital image data according to a first compression ratio, and to receive the reduced image data from the auxiliary buffer memory and compress the reduced image data according to a second compression ratio which is different from the first compression ratio; and a memory card to store the compressed image data.

4. The image processing unit, as recited in claim 3, further comprising:

a playback and display unit the receive the image data stored in at least one of the auxiliary buffer memory and the main buffer memory and to display the image data.

5. An image processing system for a camera, comprising:

an image processing unit to produce digital data corresponding to a photographed subject;

a memory including plural regions to receive the digital image data and to store the digital image data in a respective one of the plural regions, a reducing unit to produce reduced digital image data;

a classification unit to classify the reduced digital image data into a plurality of classes based upon predetermined classification criteria; and a recording unit to record the reduced digital image data in a respective one of the plural regions of the memory according to a class classified by the classification unit.

6. An image processing system as recited in claim 5, wherein the classification unit includes an attitude detection sensor to detect an attitude of the camera, and the classification unit classifies the digital image data into a respective class based upon a detected attitude.

7. An image processing system as recited in claim 5, wherein the classification unit includes a continuous photography mode detection device, and the classification unit classifies the digital image data into a respective class based upon a state of the continuous photography mode detection device.

8. The image processing system as recited in claim 5, wherein the classification unit includes a time information detection unit to detect information concerning the time of photography, and the classification unit classifies the digital image data based upon the detected time information.

9. An image processing system, comprising:

an image processing unit to produce digital image data corresponding to an imaged subject;

a memory including plural regions to receive the digital image data and to store the digital image data in a respective one of the plural regions;

a reducing unit to produce reduced digital image data;

a classification unit to classify the reduced digital image data into a plurality of classes based upon predetermined classification criteria; and a recording unit to record the reduced digital image data in a respective one of the plural regions of the memory according to a class classified by the classification unit.

10. The image processing unit, as recited in claim 9, wherein the memory includes a main buffer memory to store one frame of image data and an auxiliary buffer memory including a plurality of storage regions, and wherein a frame of image data is stored in the main buffer memory and is transferred to a respective region of the auxiliary buffer memory based upon the classification by the classification unit.

11. The image processing system, as recited in claim 9, wherein the memory includes at least one region to store plural frames of image data which have been reduced by the reducing unit.

12. The image processing system, as recited in claim 9, wherein the classification unit includes an attitude detection sensor to detect an attitude of the image processing system, and the classification unit classifies the digital image data into a respective class based upon a detected attitude.

13. The image processing system, as recited in claim 9, wherein the classification unit includes a continuous photography mode detection device, and the classification unit classifies the digital image data into a respective class based upon a state of the continuous photography mode detection device.

14. The image processing system, as recited in claim 9, wherein the classification unit includes a time information detection unit to detect information concerning the time of photography, and the classification unit classifies the digital image data based upon the detected time information.

15. An image processing system, comprising:

a image processing unit generating digital image data corresponding to an imaged subject;

a storage unit having plural regions to store the digital image data generated by the image processing unit;

a reducing unit to produce reduced digital image data;

a classification unit to classify the reduced digital image data into a plurality of classes based upon predetermined classification criteria;

a recording unit to record the reduced digital image data in a respective one of the plurality of regions of the memory according to the class classified by the classification unit; and a display device to receive the digital image data stored in the plural regions of the storage unit and to display an image of the data stored.

16. The image processing system, as recited in claim 15, wherein the classification unit further comprises an attitude detection sensor to detect an attitude of the image processing system, and the classification unit classifies image data for storage based upon a detected attitude.

17. The image processing system, as recited in claim 15, wherein the classification unit further comprises a continuous photography mode detection device, and the classification unit classifies the digital image data based upon a state of the continuous photography mode detection device.

18. The image processing system, as recited in claim 15, wherein the classification unit includes a time information detection unit to detect information concerning the time of photography, and the classification unit clasifies the digital image data based upon the detected time information.

19. The image processing system, as recited in claim 15, further comprising a memory card and wherein the image data stored in a respective region of the storage unit is stored in the memory card when a number of frames stored in the region reaches a predetermined number.

* * * * *